(12) United States Patent
Tsue

(10) Patent No.: US 9,774,764 B2
(45) Date of Patent: Sep. 26, 2017

(54) IMAGE PROCESSING DEVICE AND IMAGE PROCESSING METHOD

(71) Applicant: KONICA MINOLTA, INC., Chiyoda-ku, Tokyo (JP)

(72) Inventor: Yasushi Tsue, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/996,259

(22) Filed: Jan. 15, 2016

(65) Prior Publication Data
US 2016/0219186 A1   Jul. 28, 2016

(30) Foreign Application Priority Data

Jan. 23, 2015   (JP) ................................ 2015-010788

(51) Int. Cl.
*H04N 1/32*   (2006.01)
*H04N 1/60*   (2006.01)
(Continued)

(52) U.S. Cl.
CPC .......... *H04N 1/648* (2013.01); *H04N 1/0473* (2013.01); *H04N 1/3935* (2013.01); *H04N 1/506* (2013.01)

(58) Field of Classification Search
None
See application file for complete search history.

(56) References Cited

U.S. PATENT DOCUMENTS 5,644,366 A * 7/1997 Ushida .................... G06T 3/403
                                                      348/625
5,836,003 A * 11/1998 Sadeh .................. H03M 7/3084
                                                      341/51
(Continued)

FOREIGN PATENT DOCUMENTS

JP    2000-278517 A    10/2000
JP    2000-280525 A    10/2000
(Continued)

OTHER PUBLICATIONS

Notice of Reasons for Rejection dated Mar. 21, 2017 issued by the Japanese Patent Office in corresponding Japanese Patent Application No. 2015-010788 and English translation. (10 pages).

(Continued)

*Primary Examiner* — Madelein Nguyen
(74) *Attorney, Agent, or Firm* — Buchanan Ingersoll & Rooney PC

(57) ABSTRACT

An image processing device includes: a compression unit that compresses original image data in units of a block; a first position correction unit that shifts positions of respective pixels contained in the original image data compressed by the compression unit such that the positions are shifted in a sub scanning direction; an expansion unit that expands the original image data shifted by the first position correction unit; and a second position correction unit that converts resolution of the original image data into higher resolution, and shifts the positions of the respective pixels of the converted original image data, wherein the first shift amount is a shift amount set in units of a shift corresponding to an integral multiple of the block, and the second shift amount is a shift amount set in units of a shift corresponding to one pixel with high resolution converted by the second position correction unit.

5 Claims, 5 Drawing Sheets

(51) Int. Cl.
*H04N 1/64* (2006.01)
*H04N 1/047* (2006.01)
*H04N 1/393* (2006.01)
*H04N 1/50* (2006.01)

(56) References Cited

U.S. PATENT DOCUMENTS

| | | | | |
|---|---|---|---|---|
| 6,116,507 | A * | 9/2000 | Fukuda | G11B 7/0033 235/454 |
| 6,317,220 | B1 * | 11/2001 | Fujita | H04N 1/4056 347/131 |
| 6,491,373 | B1 * | 12/2002 | Fujita | B41J 19/142 347/15 |
| 6,674,546 | B1 * | 1/2004 | Nakahara | G06K 15/02 358/1.9 |
| 6,917,434 | B1 * | 7/2005 | Ohta | G06K 15/00 358/1.13 |
| 7,155,069 | B2 * | 12/2006 | Ishizaka | G06T 3/403 358/1.2 |
| 7,593,129 | B2 * | 9/2009 | Ishizaka | B41J 2/04505 347/19 |
| 2001/0012110 | A1 * | 8/2001 | Kanamori | H04N 1/4078 358/1.9 |
| 2001/0016065 | A1 * | 8/2001 | Yamamoto | G06T 7/11 382/173 |
| 2001/0030759 | A1 * | 10/2001 | Hayashi | G06K 9/46 358/1.9 |
| 2002/0002679 | A1 * | 1/2002 | Murakami | G06K 9/522 713/176 |
| 2004/0227978 | A1 * | 11/2004 | Enomoto | G06T 5/006 358/3.26 |
| 2005/0001868 | A1 * | 1/2005 | Matsuba | B41J 2/14233 347/17 |
| 2007/0121138 | A1 * | 5/2007 | Kondo | G06T 1/00 358/1.9 |
| 2007/0122022 | A1 * | 5/2007 | Shimizu | G06K 9/00 382/135 |
| 2008/0130943 | A1 * | 6/2008 | Goda | G06K 9/00577 382/100 |
| 2008/0266610 | A1 * | 10/2008 | Suzuki | H04N 1/00838 358/3.28 |
| 2009/0002415 | A1 * | 1/2009 | Teshigawara | B41J 2/2135 347/11 |
| 2009/0067014 | A1 * | 3/2009 | Shimizu | H04N 1/00848 358/498 |
| 2009/0086242 | A1 * | 4/2009 | Kato | H04N 1/32144 358/1.13 |
| 2009/0207430 | A1 * | 8/2009 | Hirose | G03G 15/043 358/1.9 |
| 2009/0303000 | A1 * | 12/2009 | Cowburn | G07D 7/2033 340/5.86 |
| 2010/0188670 | A1 * | 7/2010 | Otake | H04N 1/00846 358/1.2 |
| 2010/0316251 | A1 * | 12/2010 | Cowburn | G03G 21/046 382/100 |
| 2011/0116114 | A1 * | 5/2011 | Nagai | H04N 1/506 358/1.9 |
| 2011/0164261 | A1 * | 7/2011 | Hayashi | B41J 2/04505 358/1.8 |
| 2012/0033265 | A1 * | 2/2012 | Sakaue | G07D 7/20 358/3.28 |
| 2013/0258340 | A1 * | 10/2013 | Trummer | G01B 11/26 356/401 |
| 2013/0265615 | A1 * | 10/2013 | Nakashima | H04N 1/58 358/3.27 |
| 2015/0181076 | A1 * | 6/2015 | Mita | H04N 1/401 358/1.2 |
| 2015/0371431 | A1 * | 12/2015 | Korb | G06T 9/00 382/113 |
| 2016/0378016 | A1 * | 12/2016 | Tachibana | G03G 15/043 358/1.1 |

FOREIGN PATENT DOCUMENTS

| | | |
|---|---|---|
| JP | 2001-080123 A | 3/2001 |
| JP | 2008-148291 A | 6/2008 |
| JP | 2009-006676 A | 1/2009 |
| JP | 2009-141544 A | 6/2009 |
| JP | 2011-109272 A | 6/2011 |

OTHER PUBLICATIONS

Notification of Reasons for Refusal issued in corresponding Japanese Patent Application No. 2015-010788, dated May 30, 2017, with English Translation (4 pages).

* cited by examiner

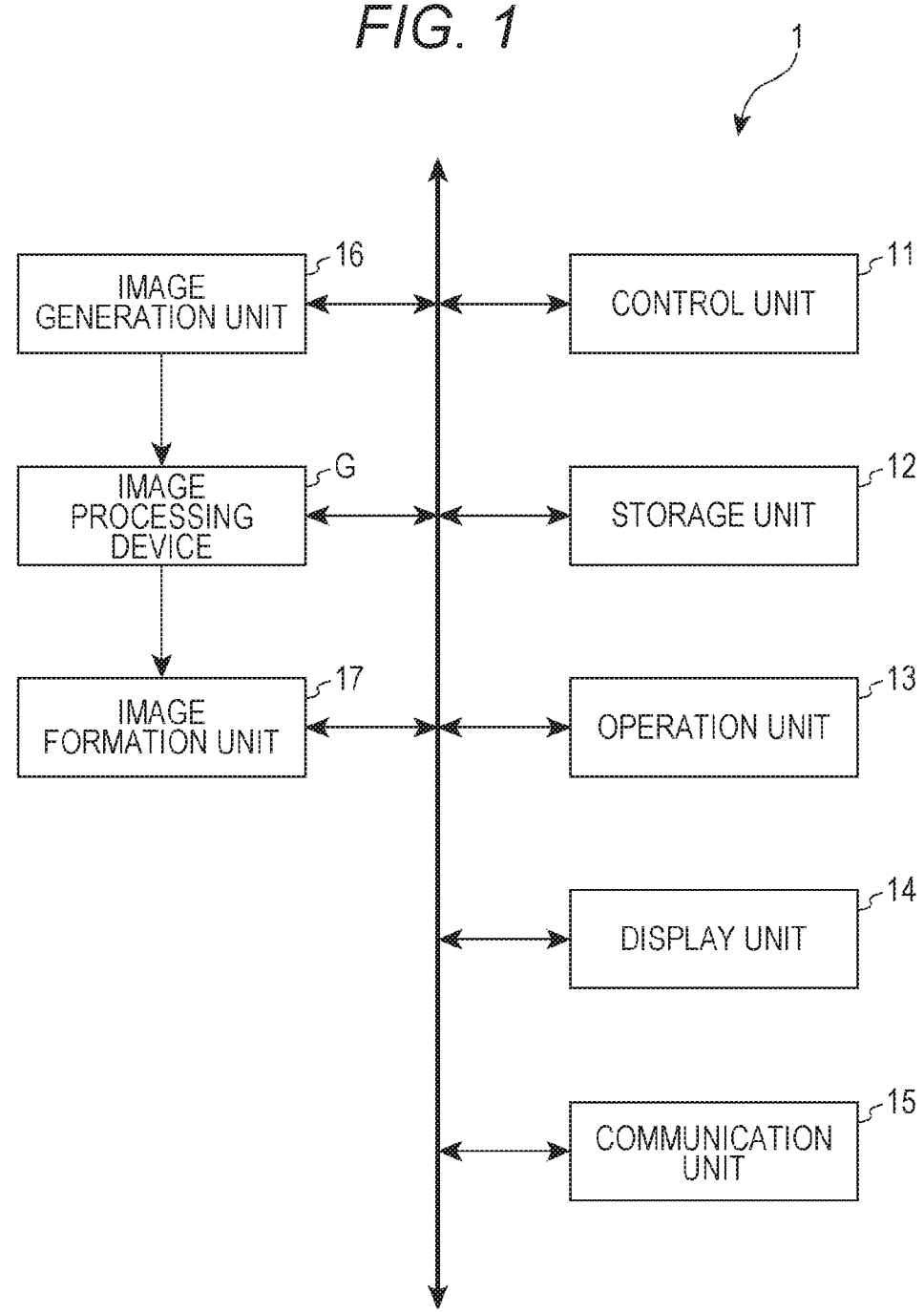

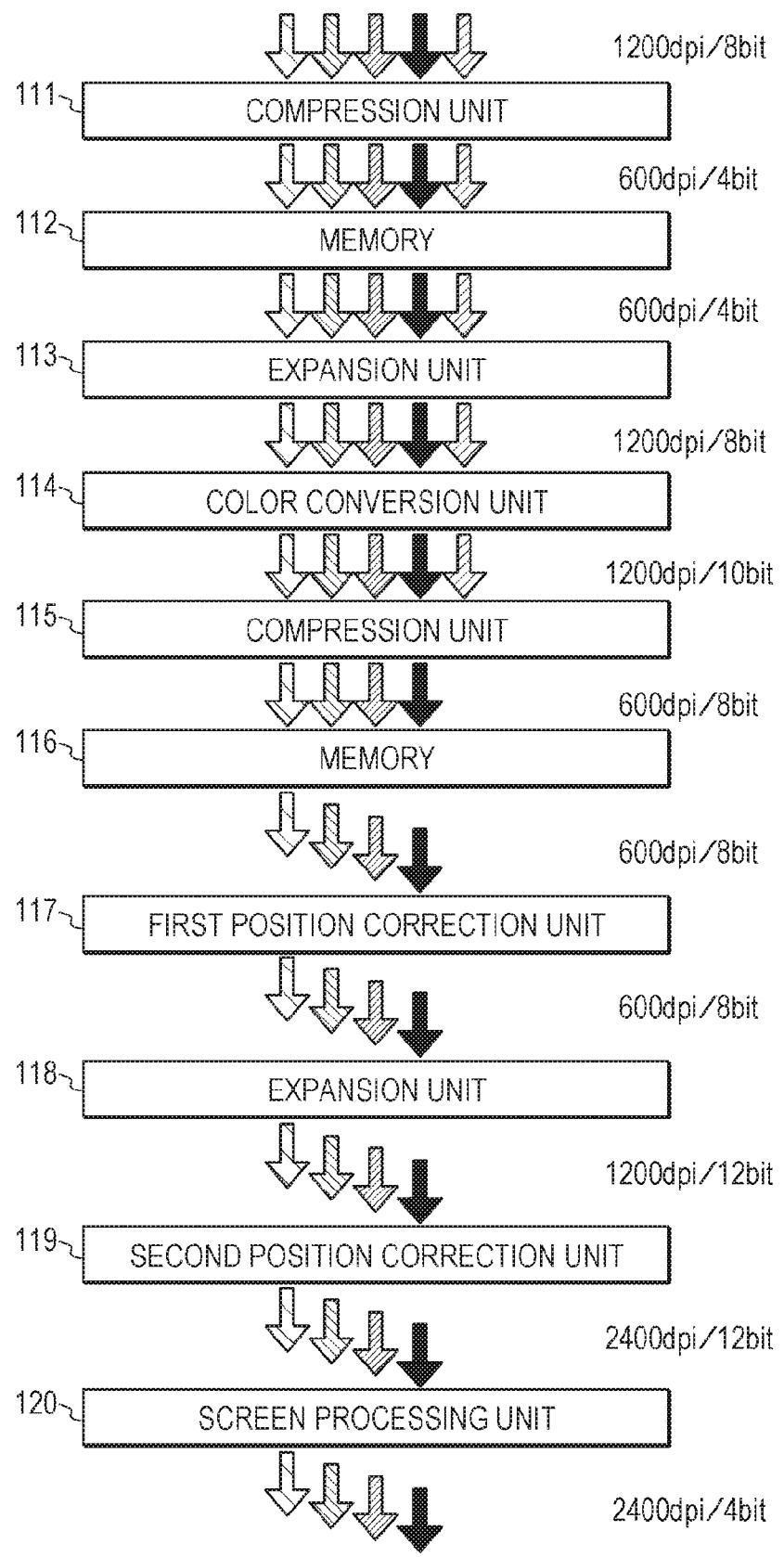

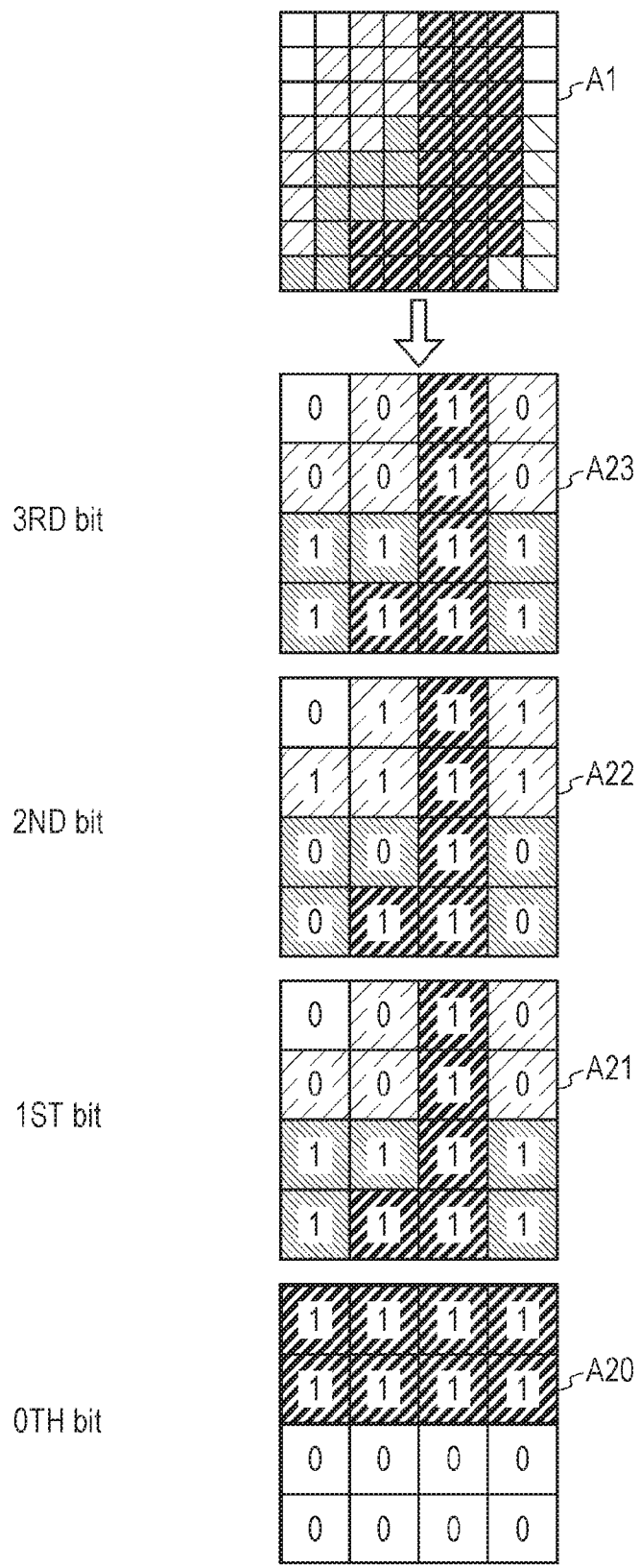

IMAGE PROCESSING DEVICE AND IMAGE PROCESSING METHOD

The entire disclosure of Japanese Patent Application No. 2015-010788 filed on Jan. 23, 2015 including description, claims, drawings, and abstract are incorporated herein by reference in its entirety.

BACKGROUND OF THE INVENTION

Field of the Invention

The present invention relates to an image processing device and an image processing method.

Description of the Related Art

When inclination, distortion or other problems are contained in an image formed on a sheet based on original image data by using an image forming apparatus, positional deviation of the image from the original position may be produced. This positional deviation is corrected by switching an address used for reading the original image data from a memory in accordance with the amount of positional deviation of the image. In this case, positions of respective pixels contained in the original image data are shifted to cancel the positional deviation produced in the formed image (for example, see JP 2008-148291 A).

A method currently proposed realizes reduction of the capacity of the memory necessary for storing the original image data by compressing the image data in units of a block, roughly shifting the positions of the respective pixels in units of this block, and then finely shifting the positions of the respective pixels after expanding the original image data (for example, see JP 2000-280525 A).

According to this method, the positions of the respective pixels are shifted only in units of one pixel. In this case, a considerable gap is produced in the image as a result of shifts of the respective pixels of the original image data when the original resolution of the original image data is low. This gap may deteriorate image quality.

For reducing visibility of this gap, there is proposed a further method which divides the unit of shift into a unit of one block, a unit of one pixel, and a unit smaller than one pixel to allow correction in stages (for example, see JP 2009-141544 A).

According to the method noted above, the shift in a unit smaller than one pixel is realized by interpolation. In this case, the shift based on interpolation becomes a rough shift when the original resolution of the original image data is low. The rough shift produces a considerable gap at the portion of interpolation, thereby deteriorating image quality.

SUMMARY OF THE INVENTION

An object of the present invention is to realize correction of positional deviation while reducing deterioration of image quality.

To achieve the abovementioned object, according to an aspect, an image processing device reflecting one aspect of the present invention comprises: a compression unit that compresses original image data in units of a block; a first position correction unit that shifts positions of respective pixels contained in the original image data compressed by the compression unit such that the positions are shifted in a sub scanning direction in accordance with a first shift amount included in a pair of the first shift amount and a second shift amount corresponding to divisions of a shift amount for correcting positional deviation of the respective pixels in the sub scanning direction; an expansion unit that expands the original image data shifted by the first position correction unit; and a second position correction unit that converts resolution of the original image data expanded by the expansion unit into higher resolution, and shifts the positions of the respective pixels of the converted original image data in the sub scanning direction in accordance with the second shift amount, wherein the first shift amount is a shift amount set in units of a shift corresponding to an integral multiple of the block, and the second shift amount is a shift amount set in units of a shift corresponding to one pixel with high resolution converted by the second position correction unit.

According to the invention of Item. 2, there is provided the image processing device of Item. 1, wherein the first position correction unit preferably shifts the positions of the respective pixels contained in the original image data compressed by the compression unit such that the positions are shifted in a main scanning direction in accordance with a third shift amount included in a pair of the third shift amount and a fourth shift amount corresponding to divisions of a shift amount for correcting positional deviation of the respective pixels in the main scanning direction, the second position correction unit preferably shifts the positions of the respective pixels of the original image data subjected to resolution conversion in the main scanning direction in accordance with the fourth shift amount, the third shift amount is preferably a shift amount set in units of a shift corresponding to an integral multiple of the block, and the fourth shift amount is preferably a shift amount set in units of a shift corresponding to one pixel with high resolution converted by the second position correction unit.

According to the invention of Item. 3, there is provided the image processing device of Item. 1 or 2, wherein each of the first position correction unit and the second position correction unit preferably shifts the positions of the respective pixels by switching an address used for reading the original image data from a memory storing the original image data.

According to the invention of Item. 4, there is provided the image processing device of any one of Items. 1 to 3, wherein the image processing device preferably further comprises a screen processing unit that performs a process for the original image data, and the screen processing unit preferably performs a screen process for the original image data after the positional shift performed by the second position correction unit.

To achieve the abovementioned object, according to an aspect, an image processing method reflecting one aspect of the present invention comprises: a compressing step of compressing original image data in units of a blank; a first position correcting step of shifting positions of respective pixels contained in the original image data compressed by the compressing step such that the positions are shifted in a sub scanning direction in accordance with a first shift amount included in a pair of the first shift amount and a second shift amount corresponding to divisions of a shift amount for correcting positional deviation of the respective pixels in the sub scanning direction; an expanding step of expanding the original image data shifted by the first position correcting step; and a second position correcting step of converting resolution of the original image data expanded by the expanding step into higher resolution, and shifting the positions of the respective pixels of the converted original image data in the sub scanning direction in accordance with the second shift amount, wherein the first shift amount is a shift amount set in units of a shift corresponding to an integral multiple of the block, and the second shift amount is a shift amount set in units of a shift corresponding to one pixel with high resolution converted by the second position correcting step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 1 is a block diagram illustrating a configuration of an image forming apparatus including an image processing device according to an embodiment, showing each of functions of the image forming apparatus;

FIG. 2 is a block diagram illustrating a configuration example of the image processing device;

FIG. 3 is a view lustrating data planes of original image data in one block compressed in units of a block;

DESCRIPTION OF THE PREFERRED EMBODIMENTS

Figure 4A:
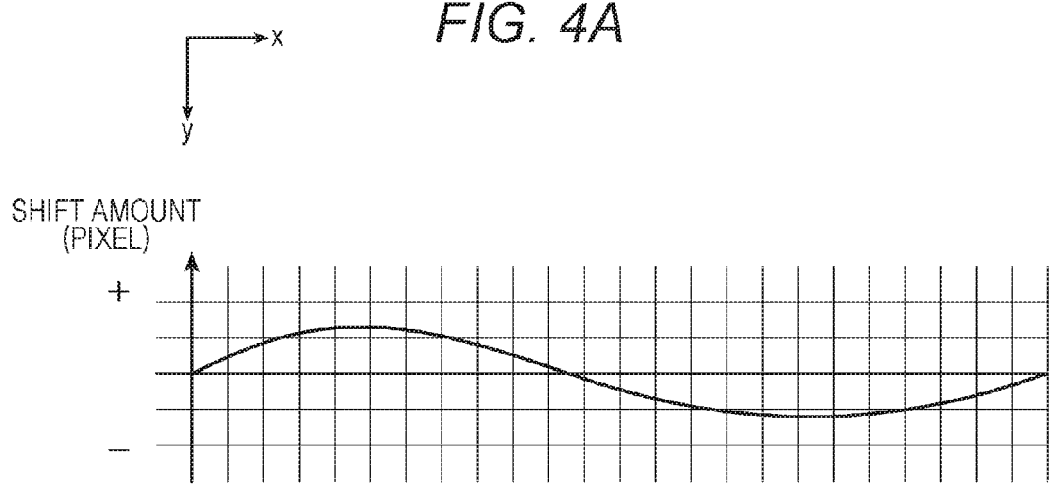
FIG. 4A is a graph showing a shift amount determined in accordance with positional deviation detected beforehand.

Hereinafter, an embodiment of an image processing device and an image processing method of the present invention will be described with reference to the drawings. However, the scope of the invention is not limited to the illustrated examples.

FIG. 1 illustrates a configuration of an image forming apparatus 1 including the image processing device of this embodiment, showing each of functions of the image forming apparatus 1.

The image forming apparatus 1 is capable of forming an image by using color material, such as toner, on a sheet in accordance with an image forming instruction received from the outside.

As illustrated in FIG. 1, the image forming apparatus 1 includes a control unit 11, a storage unit 12, an operation unit 13, a display unit 14, a communication unit 15, an image generation unit 16, an image processing device G, and an image formation unit 17.

The control unit 11 reads and executes programs stored in the storage unit 12 to control respective units of the image forming apparatus 1. The control unit 11 may include a CPU (central processing unit), a RAM (random access memory), and others.

For example, the control unit 11 allows the image processing device G to perform image processing for original image data generated by the image generation unit 16, and allows the image formation unit 17 to form an image on a sheet based on the original image data subjected to image processing.

The storage unit 12 stores programs readable by the control unit 11, and files and the like used for execution of the programs. The storage unit 12 may be constituted by a large-capacity memory such as a hard disk.

The operation unit 13 generates operation signals in accordance with operation by a user, and outputs the generated operation signals to the control unit 11. The operation unit 13 may be constituted by keys, a touch panel formed integrally with the display unit 14, or the like.

The display unit 14 displays an operation screen and the like in accordance with an instruction issued from the control unit 11. The display unit 14 may be constituted by an LCD (liquid crystal display), an OELD (original electro luminescence display), or the like.

The communication unit 15 communicates with an external device provided on a network, such as a user terminal, a server, and another image forming apparatus.

For example, the communication unit 15 receives data describing contents of an instruction for forming an image in page description language (PDL) received from a user terminal via a network. (This data is hereinafter referred to as PDL data.)

The image generation unit 16 rasterizes PDL data received from the communication unit 15, and generates original image data in bitmap format specifying a gradation value for each pixel. The image generation unit 16 generates the original image data for each color of C (cyan), M (magenta), Y (yellow), and K (black). The gradation value is a data value indicating a tint of an image. For example, an 8-bit data value indicates a tint ranging from 0 to 255 gradations.

The image generation unit 16 generates image data, and also attributes data indicating attributes of respective pixels contained in the image data.

For example, the image generation unit 16 determines attributes of respective pixels as "text" when the pixels are contained in an image such as a character, an alphabet, and a numeral drawn in accordance with character codes described in PDL data, and determines respective pixels as "graphic" when the pixels are contained in an image such as a rule, a polygon, and a circle drawn in accordance with description in vector graphics such as DXF (drawing exchange format), SVG (scalable vector graphics), and WMF (Windows metafile format). In addition, the image generation unit 16 determines attributes of an image as "image" when the image is a picture drawn in JPEG (joint photographic experts group) file or the like.

The image forming apparatus 1 may include an image reading unit having a copying function, and allow the image reading unit to read a document sheet set by the user at the time of generation of original image data.

The image processing device G performs various types of image processing for the original image data generated by the image generation unit 16.

The image formation unit 17 forms an image on a sheet based on the original image data obtained after image processing performed by the image processing device G.

When the image formation unit 17 is of an electrophotographic type, the image formation unit 17 scans and exposes a photosensitive body by using laser beams modulated based on the original image data. Then, the image formation unit 17 supplies color material such as toner to the photosensitive body for development, and transfers an image formed on the photosensitive body to a sheet.

When the image formation unit 17 is of a tandem type, a plurality of photosensitive bodies corresponding to respective colors of C, M, Y, and K are disposed in series. The image formation unit 17 forms images in the respective colors on the photosensitive bodies in the corresponding colors, and transfers the images in the respective colors from the respective photosensitive bodies to a sheet via an image carrier such as an intermediate transfer belt while overlapping the images in the respective colors on each other.

An image formed on a sheet by using the image forming apparatus 1 may contain positional deviation caused by distortion or positional shifts of image forming parts included in the image formation unit 17, or for other reasons. The positional deviation producing inclination of an image is called skew, while the positional deviation producing wavy distortion of an image is called bow. The tandem-type image formation unit 17 may produce positional deviation of an image between overlapped colors, called resist deviation.

For canceling this positional deviation of an image, the image forming apparatus 1 corrects original image data by using the image processing device G.

FIG. 2 illustrates a configuration example of the image processing device G for correcting positional deviation.

As illustrated in FIG. 2, the image processing device G includes a compression unit 111, a memory 112, an expansion unit 113, a color conversion unit 114, a compression unit 115, a memory 116, a first position correction unit 117, an expansion unit 118, a second position correction unit 119, and a screen processing unit 120.

Image processing procedures performed by the respective units of the image processing device G are hereinafter described.

When original image data and attribute data are generated by the image generation unit 16 of the image forming apparatus 1 for each color of C, M, Y, and K, the generated original image data and attribute data are transferred to the image processing device G.

The resolution of the original image data in each color is 1,200 dpi. Each of pixels contained in the original image data has an 8-bit gradation value. Each of pixels contained in the attribute data has a 4-bit data value indicating an attribute of character, graphic, or image.

As illustrated in FIG. 2, the compression unit 111 of the image processing device G compresses the original image data generated by the image generation unit 16 to produce original data having a resolution of 600 dpi and a 4-bit data value for each pixel, and writes the compressed original data to the memory 112 together with the attribute data.

The memory 112 functioning as a buffer memory may be constituted by a DRAM (dynamic RAM) or the like.

The compression unit 111 compresses the original image data by using a compression system for compressing data in units of a block.

The compression system for compressing data in units of a block may be a BTC (block truncation coding) degradation compression system, for example. The degradation compression system is a method which switches coding between BTC coding and concentration pattern coding in accordance with attributes of respective pixels indicated by attribute data, or characteristics of a local area, as described in JP 2011-24162 A.

In case of compression by using the BTC compression system, the compression unit 111 divides respective pixels of original image data having a resolution of 1,200 dpi and a 8-bit gradation value for each pixel into units of a block containing 8×8 pixels, and obtains the maximum and the minimum of the respective gradation values of 8×8 pixels.

Then, the compression unit 111 calculates thresholds Tha1 to Tha7 based on the obtained maximum and minimum by using the following equations.

$$THa7 = min + (Max - min) \times 13/14$$

$$THa6 = min + (Max - min) \times 11/14$$

$$THa5 = min + (Max - min) \times 9/14$$

$$THa4 = min + (Max - min) \times 7/14$$

$$THa3 = min + (Max - min) \times 5/14$$

$$THa2 = min + (Max - min) \times 3/14$$

$$THa1 = min + (Max - min) \times 1/14$$

In the respective equations, "Max" and "min" indicate the maximum and the minimum, respectively.

The compression unit 111 divides 8×8 pixels into small block units each containing 2×2 pixels, and calculates an average of gradation values of 2×2 pixels contained in each of the small blocks. The compression unit 111 compares the calculated averages with the respective thresholds Tha1 to Tha7, and converts the averages into coded 3-bit gradation values (000 to 111) in the following manners. The compression unit 111 performs resolution conversion which establishes 2×2 pixels as one pixel unit, and determines the coded 3-bit gradation values as gradation values of the respective pixels after resolution conversion.

111 when average is in a range from Tha7 to Max (inclusive)
  110 when average is Tha6 or larger and smaller than Tha7
  101 when average is Tha5 or larger and smaller than Tha6
  100 when average is Tha4 or larger and smaller than Tha5
  011 when average is Tha3 or larger and smaller than Tha4
  010 when average is Tha2 or larger and smaller than Tha3
  001 when average is Tha1 or larger and smaller than Tha2
  000 when average is min or larger and smaller than Tha1

By repeating the foregoing procedures for the respective blocks each containing 8×8 pixels, each block containing 8×8 pixels and having an 8-bit gradation value for each pixel are converted into a block containing 4×4 pixels and having a 3-bit gradation value for each pixel.

The compression unit 111 adds 1 bit included in 8 bits of the maximum and 8 bits of the minimum to a low-order bit of the coded 3-bit gradation value to output original image data having a 4-bit data value for each pixel.

FIG. 3 illustrates four data planes A20 to A23 obtained by compressing a block A1 containing 8×8 pixels. Each of the data planes A20 to A23 indicates corresponding 1 bit of a 4-bit data value of each of 4×4 pixels.

As illustrated in FIG. 3, the data planes A21 to A23 indicating the high-order 3 bits (1st to 3rd bits) included in the four data planes A20 to A23 are occupied by 3 bits of the coded gradation value of each pixel, while the data plane A20 indicating the low-order one bit (0th bit) is occupied by 1 bit included in the 8 bits of the maximum or the 8 bits of the minimum.

The compression unit 111 also converts resolution of the attribute data in accordance with conversion of resolution of the original image data. More specifically, the compression unit 111 unifies respective attributes of 2×2 pixels into one attribute for each of small blocks containing 2×2 pixels and divided from one block containing 8×8 pixels, and allocates the unified attribute to each pixel after resolution conversion.

For unification, the respective attributes of 2×2 pixels may be unified into the most common attribute of the 2×2 pixels, or may be unified into one attribute determined in accordance with characteristics of an image. In case of an image whose shape is given priority, for example, an attribute of each pixel included in 2×2 pixels after resolution conversion may be determined as "text" when the attributes of 2×2 pixels include at least one attribute of text greatly affecting the shape of the image. In case of an image whose gradation is given priority, an attribute of each pixel included in 2×2 pixels after resolution conversion may be determined as "image" when the attributes of 2×2 pixels include at least one attribute of image greatly affecting the gradation of the image.

The expansion unit 113 reads compressed original image data from the memory 112, and expands the read original image data to output the original image data having a resolution of 1,200 dpi and an 8-bit gradation value for each pixel.

More specifically, the expansion unit 113 divides the respective pixels of the read original image data into block units each containing 4×4 pixels, and connects the low-order 1 bit of 4×4 pixels to obtain the 8-bit maximum and the 8-bit minimum. In addition, the expansion unit 113 extracts the high-order 3 bits from 4×4 pixels to obtain the coded 3-bit gradation value for each pixel.

The expansion unit 113 calculates a decoded 8-bit gradation value from the coded 3-bit gradation value in the following manner based on the obtained maximum and minimum.

When the coded gradation is 111, Max
When the coded gradation is 110, min+(Max−min)×12/14
When the coded gradation is 101, min+(Max−min)×10/14
When the coded gradation is 100, min+(Max−min)×8/14
When the coded gradation is 011, min+(Max−min)×6/14
When the coded gradation is 010, min+(Max−min)×4/14
When the coded gradation is 001, min+Max−min)×2/14
When the coded gradation is 000, min In the respective equations, "Max" and "min" indicate the maximum and the minimum, respectively.

The expansion unit 113 performs resolution conversion which divides respective pixels of the original image data into 2×2 pixels, and allocates the decoded 8-bit gradation value to each of the 2×2 pixels after resolution conversion.

In addition, the expansion unit 113 converts resolution of the attribute data in accordance with the conversion of resolution of the original image data, and allocates the attribute of each pixel before resolution conversion to each of the 2×2 pixels after resolution conversion.

Subsequently, the color conversion unit 114 performs color conversion of the expanded original image data, and outputs original image data having a resolution of 1,200 dpi and a 10-bit gradation value for each pixel.

The color conversion process is a process for converting gradation values for the respective input colors of C, M, Y, and K into gradation values corrected such that the gradations, tones and the like of the respective colors C, M, Y, and K agree with desired gradations, tones and the like. For increasing reproducibility of gradations, the color conversion process expands bit widths, and converts input 8-bit gradation values into 10-bit gradation values.

Then, the compression unit 115 compresses the original image data obtained after the color conversion process. The compression process performed herein by the compression unit 115 may be different from the foregoing compression process performed by the compression unit 111. However, it is preferable that the respective compression processes are similar from the viewpoint of simplification in design.

When the compression unit 115 performs the compression process similar to the compression process performed by the compression unit 111, the compression unit 115 generates original image data having a resolution of 600 dpi and a 4-bit data value for each pixel after the compression process. As illustrated in FIG. 3, the 4-bit data value is constituted by 3 bits of gradation values, and 1 bit of the maximum or the minimum.

In case of the tandem-type image formation unit 17, image formation start timing varies for each color of an image to be formed. Accordingly, timing for outputting the original image data of C, M, Y, and K to the image formation unit 17 needs to be delayed in accordance with the image formation start timing for each color. For synchronizing attribute data with the original image data for each of the colors output at different timing, the compression unit 115 adds attribute data having a 4-bit data value for each pixel to the original image data for each the colors C, M, Y, and K generated by the compression process to generate original image data having a resolution of 600 dpi and an 8-bit data value for each pixel, and writes the generated original image data to the memory 116. The memory 116 is constituted by a buffer memory similarly to the memory 112. The compressed state of the original image data written to the memory 116 reduces the necessary bandwidth of the memory 116. In this case, the first position correction unit 117 or the like is allowed to access the memory 116 at a low operation frequency, wherefore power saving is achievable. In addition, reduction of the bandwidth increases a free space of the memory 116 to be shared by other processes.

The first position correction unit 117 reads the compressed original image data for the respective colors from the memory 116 in synchronization with the image formation start timing for the respective colors.

The first position correction unit 117 switches a reading address of the original image data in accordance with a first shift amount at the time of reading of the original image data so as to shift the positions of the respective pixels in a sub scanning direction and correct positional deviation of the image in the sub scanning direction.

For correction of positional deviation of the image, positional deviation of a test image formed in advance is detected, and a shift amount of each pixel of the test image sufficient for canceling the positional deviation is determined beforehand. The shift amount thus determined is divided into the first shift amount set in units of a shift corresponding to an integral multiple of a block at the time of compression, and a second shift amount set in units of a shift corresponding to one pixel having higher resolution than the original resolution (1,200 dpi) of the original image data. The first position correction unit 117 performs correction based on the first shift amount included in the foregoing first and second shift amounts.

The shift amount divided into the first shift amount set in units of a shift corresponding to one block (16×16 pixels with 2,400 dpi, 8×8 pixels with 1,200 dpi, 4×4 pixels with 600 dpi, and 1 pixel with 150 dpi) at the time of compression, and the second shift amount set in units of a shift corresponding to one pixel having a resolution of 2,400 dpi, may be divided by the following procedures.

A shift amount in the sub scanning direction corresponding to a pixel position in a main scanning direction is determined beforehand in units of one pixel having 2,400 dpi in accordance with a detected positional shift amount.

The determined shift amount in the sub scanning direction is divided by 16 pixels (2,400 dpi) corresponding to the width of one block in the sub scanning direction. An integer part of a quotient thus calculated is determined as the first shift amount, while a remaining part of the quotient is determined as the second shift amount.

FIG. 4A illustrates an example of a shift amount in the sub scanning direction.

Figure 4B:
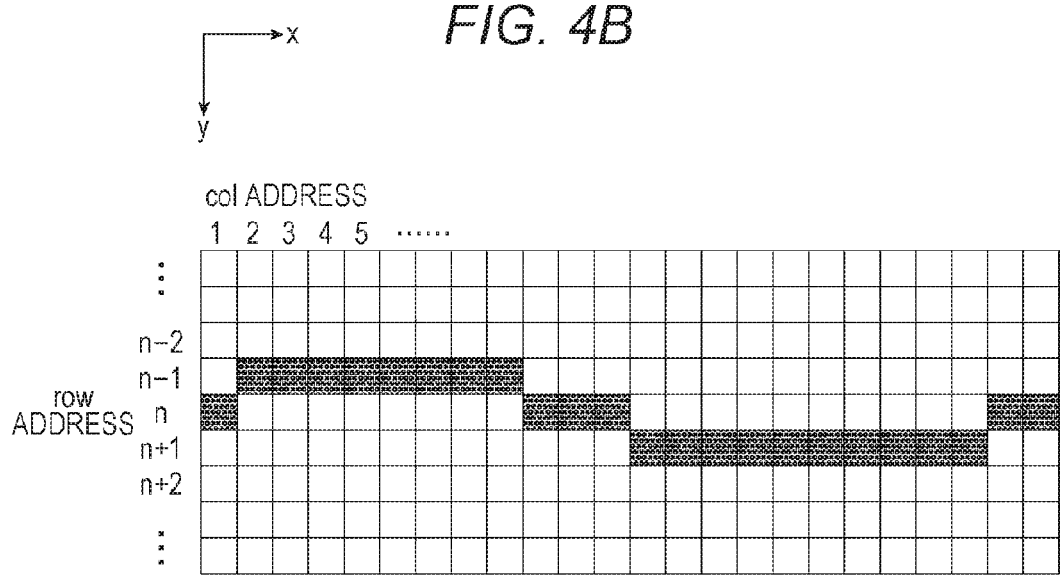
FIG. 4B is a view illustrating respective pixels of original image data corrected in accordance with a first shift amount corresponding to a division of the shift amount illustrated in FIG. 4A and set in units of a shift corresponding to one block at the time of compression.

FIG. 4B illustrates an example of shifts of respective pixels having a resolution of 600 dpi in accordance with the first shift amount corresponding to a division of the shift amount illustrated in FIG. 4A and set in units of a shift corresponding to one block (4×4 pixels with 600 dpi).

In FIGS. 4A and 4B, one square indicates one block (4×4 pixels with 600 dpi).

As illustrated in FIG. 4B, addresses for reading original image data in units of 4×4 pixels are allocated to original image data having 600 dpi and stored in the memory 116. A reading address in a main scanning direction x is called a col address, while a reading address in a sub scanning direction y is called a row address. Four lines are initially designated as lines to be read at row addresses, and then col addresses are incremented one by one for sequential reading of 4×4 pixels.

For correction of positional deviation in accordance with the first shift amount, as illustrated in FIG. 4B, original image data is initially read with designation of a row address at n and a col address at 1. Then, subsequent image data is read with designation of a row address switched to n−1, and a col address incremented to 2. This method completes reading of 4×4 pixels on the start end side in the sub scanning direction y, and a partial shift of the position of the image toward the start end side. Accordingly, a shift of pixel positions for each unit of 4×4 pixels in the sub scanning direction y is achievable by switching the row address in accordance with the first shift amount and incrementing the col address.

The first position correction unit 117 also corrects positional deviation in the main scanning direction in a manner similar to the correction of positional deviation in the sub scanning direction discussed above.

The first position correction unit 117 shifts positions of respective pixels in the main scanning direction in accordance with a third shift amount included in a pair of the third shift amount and a fourth shift amount corresponding to divisions of a shift amount which has been determined for correcting positional deviation of the respective pixels in the main scanning direction.

In case of the example illustrated in FIG. 4B, a shift amount in the main scanning direction corresponding to a pixel position in the sub scanning direction is determined beforehand for each pixel with 2,400 dpi in accordance with a detected positional shift amount. The determined shift amount is divided into the third shift amount set in units of a shift corresponding to one block at the time of compression, and the fourth shift amount set in units of a shift corresponding to one pixel with 2,400 dpi in a similar manner to the case of the sub scanning direction.

At the time of reading of original image data from the memory 116, the first position correction unit 117 shifts positions of respective pixels in the main scanning direction x in units of four lines by switching a col address to be initially read in accordance with the third shift amount. For example, when the third shift amount is +1 pixel at the row address n in the sub scanning direction y, 1 is added to the col address 1 to shift the positions of the respective pixels of the four lines by an amount of four pixels toward the final end side in the main scanning direction x.

The expansion unit 118 expands the original image data corrected by the first position correction unit 117 in a manner similar to the manner of expansion performed by the expansion unit 113, and outputs original image data having a resolution of 1,200 dpi and an 8-bit gradation value for each pixel, and attribute data having a 4-bit data value for each pixel.

The second position correction unit 119 which includes a line buffer converts resolution of the expanded original image data into a high resolution of 2,400 dpi equivalent to the resolution of the second shift amount, and writes the converted original image data to the line buffer. The second position correction unit 119 sequentially reads the original image data written to the line buffer from the head of the original image data, and outputs original image data having a resolution of 1,200 dpi and a 12-bit data value (8-bit image data and 4-bit attribute data) for each pixel to the screen processing unit 120 in parallel with the process for writing the original image data to the line buffer.

At the time of reading, the second position correction unit 119 corrects positional deviation of respective pixels in the sub scanning direction by switching an address used for reading original image data from the line buffer in units of a pixel, such that the address is switched in accordance with the foregoing second shift amount set in units of a shift corresponding to one pixel with 2,400 dpi.

Figure 5A:
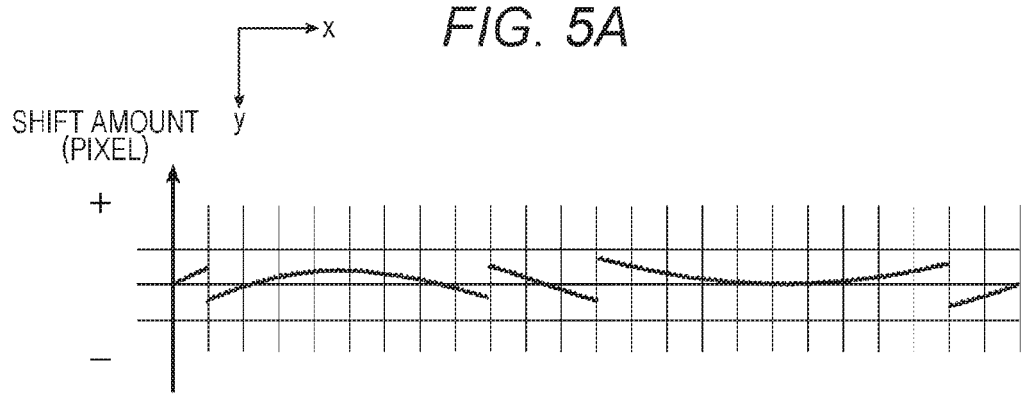
FIG. 5A is a graph showing a second shift amount corresponding to a division of the shift amount illustrated in FIG. 4A and set in units of a shift corresponding to one pixel with a resolution of 2,400 dpi.

FIG. 5A, illustrates the second shift amount corresponding to a division of the shift amount illustrated in FIG. 4A.

In FIG. 5A, one square indicates one block (16×16 pixels with 2,400 dpi, 8×8 pixels with 1,200 dpi, and one pixel with 150 dpi).

As illustrated in FIG. 5A, the second shift amount indicates a shift amount not shifted by the first shift amount within one block (8 pixels with 1,200 dpi). The second shift amount is indicated in units of one pixel with 2,400 dpi (0.5 pixel with 1,200 dpi).

Figure 5B:
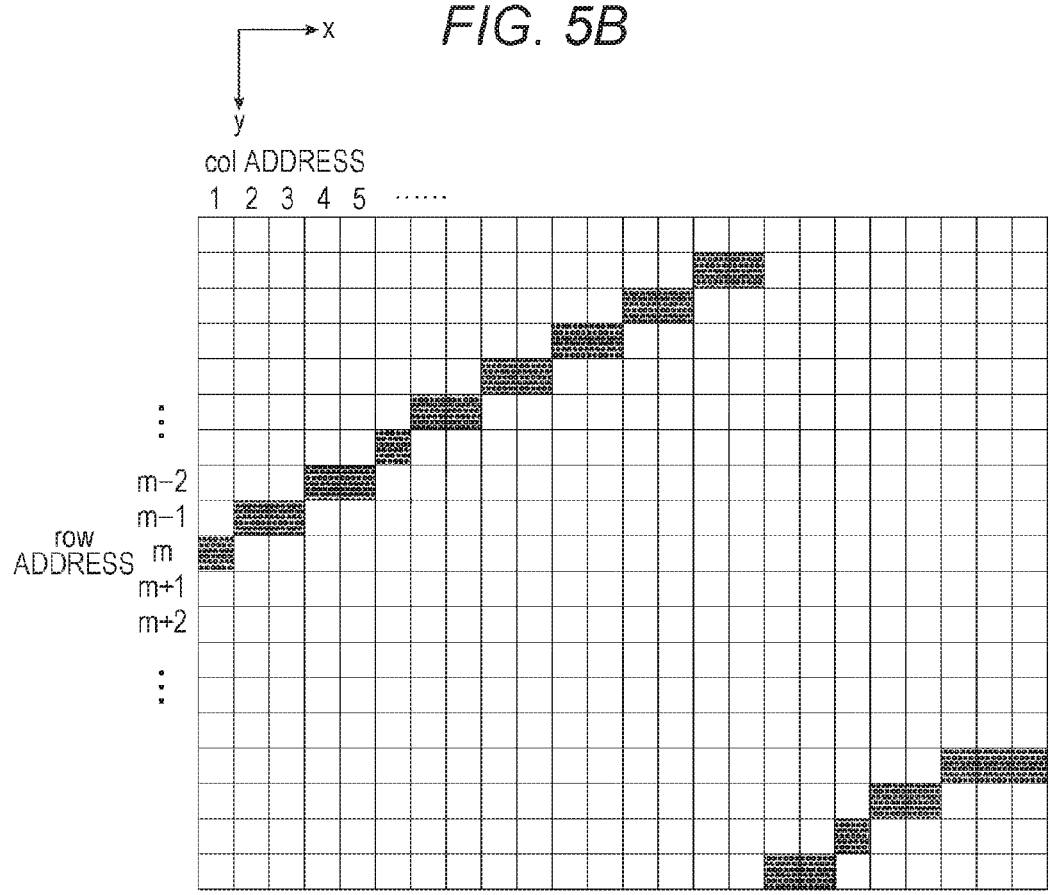
FIG. 5B is a view illustrating respective pixels of original image data corrected in accordance with the second shift amount illustrated in FIG. 5A.

FIG. 5B illustrates a part of respective pixels shifted in accordance with the second shift amount illustrated in FIG. 5A. In FIG. 5B, one square indicates one pixel with 2,400 dpi.

As illustrated in FIG. 5B, the second position correction unit 119 allocates col addresses and row addresses to original image data with 2,400 dpi similarly to the reading performed by the first position correction unit 117. In this case, the col addresses and the row addresses are allocated such that original image data can be read in units of one pixel. In other words, lines to be read at row addresses are initially designated, whereafter a col address is incremented one by one to sequentially read respective pixels.

The positional deviation correction method performed by the second position correction unit 119 shifts positions of respective pixels in the sub scanning direction y by switching the row address in accordance with the second shift amount while incrementing the col address, similarly to the correction method performed by the first position correction unit 117.

In addition, the second position correction unit 119 shifts positions of respective pixels in the main scanning direction x by switching the col address to be initially read in accordance with the fourth shift amount.

The screen processing unit 120 performs a screen process for the original image data corrected by the second position correction unit 119. The screen process achieves conversion into 4-bit gradation values by comparison between dither matrix containing thresholds set by ordered dither and gradation values of respective pixels contained in the original image data. At the time of the screen process, screen ruling or the like may be varied in accordance with attributes indicated by attribute data by using dither matrix corresponding to the attributes. After the screen process, the screen processing unit 120 abandons the attribute data, and outputs original image data having a resolution of 2,400 dpi and a 4-bit gradation value for each pixel.

The screen process performed after the correction of positional deviation prevents a loss of the screen shape produced by the screen process so that a loss caused as a result of shifts of positions of respective pixels can be avoided.

As described above, the image processing device G according to this embodiment includes: the compression unit 115 that compresses original image data in units of a block; the first position correction unit 117 that shifts positions of respective pixels contained in the original image data compressed by the compression unit 115 such that the positions are shifted in the sub scanning direction in accordance with the first shift amount included in the pair of first shift amount and second shift amount corresponding to divisions of a shift amount for correcting positional deviation of the respective pixels in the sub scanning direction; the expansion unit 118 that expands the original image data shifted by the first position correction unit 117; and the second position correction unit 119 that converts resolution of the original image data expanded by the expansion unit 118 into higher resolution, and shifts the positions of the respective pixels of the converted original image data in the sub scanning direction in accordance with the second shift amount. The first shift amount is a shift amount set in units of a shift corresponding to an integral multiple of the block. The second shift amount is a shift amount set in units of a shift corresponding to one pixel with high resolution converted by the second position correction unit 119.

According to this structure, correction of positional deviation of an image is performed in two stages by the first position correction unit 117 and the second position correction unit 119. More specifically, positions of respective pixels are shifted in units of one block by the first position correction unit 117, and further shifted in units of one pixel having a higher resolution than the original resolution by the second position correction unit 119.

The shift in units of one block performed by the first position correction unit 117 reduces a capacity of a storage resource, such as a line buffer, necessary for storing original image data at the time of correction. Moreover, the shift in units of one pixel with a high resolution performed by the second position correction unit 119 reduces a gap of an image produced by the shift to a smaller gap than the gap of the original one pixel, thereby avoiding deterioration of image quality. Accordingly, correction of positional deviation is achievable while reducing deterioration of image quality.

The embodiment described herein is presented only by way of preferred example of the present invention. The present invention is not limited to the specific embodiment herein, but may be practiced otherwise without departing from the subject matters of the present invention.

For example, the image processing device G may include a shift amount calculation unit which divides a shift amount in accordance with a size of a block unit or resolution of original image data finally output. In this case, a shift amount is divided by the shift amount calculation unit based on a new block unit or final resolution. A first shift amount and a third shift amount thus obtained are output to the first position correction unit 117, while a second shift amount and a fourth shift amount thus obtained are output to the second position correction unit 119. Accordingly, division of a shift amount in accordance with the block size or resolution is realizable even when the block size at the time of compression changes with resolution of the original image data, or when resolution of the original image data finally output varies. As a result, accuracy of positional deviation correction improves.

Furthermore, the control unit 11 may execute the processing procedures for the respective units included in the image processing device G under programs read by the control unit 11. In addition, a different computer such as a general-purpose PC (personal computer) may execute the processing procedures under programs read by the different computer in place of the image forming apparatus 1.

A computer-readable medium for storing the programs may be a non-volatile memory such as a ROM and a flash memory, or a portable recording medium such as a CD-ROM, for example. A medium for supplying data of the programs via a communication line may be carrier waves, for example.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An image processing device comprising:
a hardware processor configured to
compress original image data into block units;
shift positions of respective pixels contained in the compressed original image data such that the positions are shifted in a sub scanning direction, which is a direction of a scanning operation for scanning the original image, in accordance with a first shift amount for correcting positional deviation of the respective pixels in the sub scanning direction;
expand the compressed original image data that was shifted; and
convert a first resolution of the expanded original image data into a higher resolution, and shift the positions of the respective pixels of the converted original image data in the sub scanning direction in accordance with a second shift amount, wherein
the first shift amount is a shift amount set in a unit corresponding to an integral multiple of the block units, and
the second shift amount is a shift amount set in a unit corresponding to one pixel of the original image data converted with the higher resolution.

2. The image processing device according to claim 1, wherein
the positions of the respective pixels contained in the compressed original image data are shifted in a main scanning direction in accordance with a third shift amount and a fourth shift amount for correcting positional deviation of the respective pixels in the main scanning direction,
the positions of the respective pixels of the original image data subjected to resolution conversion are shifted in the main scanning direction in accordance with the fourth shift amount,
the third shift amount is a shift amount set in a unit corresponding to an integral multiple of the block units, and
the fourth shift amount is a shift amount set in a unit corresponding to one pixel converted with the higher resolution.

3. The image processing device according to claim 1, wherein the hardware processor shifts the positions of the respective pixels by switching an address used for reading the original image data from a memory storing the original image data.

4. The image processing device according to claim 1, wherein the hardware processor is further configured to perform a screen process for the converted original image data after the positional shift is performed on the converted original image data.

5. An image processing method comprising:
   a compressing step of compressing original image data into block units;
   a first position correcting step of shifting positions of respective pixels contained in the original image data compressed by the compressing step such that the positions are shifted in a sub scanning direction, which is a direction of a scanning operation for scanning the original image, in accordance with a first shift amount for correcting positional deviation of the respective pixels in the sub scanning direction;
   an expanding step of expanding the compressed original image data that was shifted by the first position correcting step; and
   a second position correcting step of converting a first resolution of the original image data expanded by the expanding step into a higher resolution, and shifting the positions of the respective pixels of the converted original image data in the sub scanning direction in accordance with a second shift amount, wherein
   the first shift amount is a shift amount set in a unit corresponding to an integral multiple of the block units, and
   the second shift amount is a shift amount set in a unit corresponding to one pixel of the original image data converted with the higher resolution converted by the second position correcting step.

* * * * *